US008090905B2

(12) United States Patent
Stenfort

(10) Patent No.: US 8,090,905 B2
(45) Date of Patent: Jan. 3, 2012

(54) SYSTEM, METHOD, AND COMPUTER PROGRAM PRODUCT FOR CONVERTING LOGICAL BLOCK ADDRESS DE-ALLOCATION INFORMATION IN A FIRST FORMAT TO A SECOND FORMAT

(75) Inventor: Ross John Stenfort, Los Altos, CA (US)

(73) Assignee: SandForce, Inc., Milpitas, CA (US)

(*) Notice: Subject to any disclaimer, the term of this patent is extended or adjusted under 35 U.S.C. 154(b) by 440 days.

(21) Appl. No.: 12/413,307

(22) Filed: Mar. 27, 2009

(65) Prior Publication Data

US 2010/0251009 A1   Sep. 30, 2010

(51) Int. Cl.
*G06F 12/00* (2006.01)
(52) U.S. Cl. ......................... 711/112; 711/103
(58) Field of Classification Search .................. 711/112, 711/103
See application file for complete search history.

(56) References Cited

U.S. PATENT DOCUMENTS

| 5,386,552 | A | 1/1995 | Garney |
| 5,485,595 | A | 1/1996 | Assar et al. ................... 395/430 |
| 5,519,831 | A | 5/1996 | Holzhammer |
| 5,544,356 | A | 8/1996 | Robinson et al. ............. 395/600 |
| 5,568,423 | A | 10/1996 | Jou et al. ................. 365/185.33 |
| 5,568,626 | A | 10/1996 | Takizawa ..................... 395/430 |
| 5,621,687 | A | 4/1997 | Doller ....................... 365/185.29 |
| 5,675,816 | A | 10/1997 | Hiyoshi et al. |
| 5,819,307 | A | 10/1998 | Iwamoto et al. .............. 711/103 |
| 5,835,935 | A | 11/1998 | Estakhri et al. ............... 711/103 |
| 5,881,229 | A | 3/1999 | Singh et al. .............. 395/200.33 |
| 5,937,434 | A | 8/1999 | Hasbun et al. |
| 5,956,473 | A | 9/1999 | Ma et al. .................. 395/182.03 |
| 5,963,970 | A | 10/1999 | Davis ........................... 711/103 |
| 6,000,006 | A | 12/1999 | Bruce et al. ................... 711/103 |
| 6,154,808 | A | 11/2000 | Nagase et al. ................ 711/103 |
| 6,173,360 | B1 | 1/2001 | Beardsley et al. |
| 6,230,233 | B1 | 5/2001 | Lofgren et al. ............... 711/103 |
| 6,405,295 | B1 | 6/2002 | Bando .......................... 711/165 |
| 6,446,183 | B1 | 9/2002 | Challenger et al. |
| 6,539,453 | B1 | 3/2003 | Guterman ..................... 711/103 |
| 6,694,402 | B1 | 2/2004 | Muller .......................... 711/103 |
| 6,732,221 | B2 | 5/2004 | Ban ............................... 711/103 |
| 6,831,865 | B2 | 12/2004 | Chang et al. ............. 365/185.33 |
| 6,914,853 | B2 | 7/2005 | Coulson ....................... 365/236 |
| 6,925,523 | B2 | 8/2005 | Engel et al. ................... 711/103 |

(Continued)

FOREIGN PATENT DOCUMENTS

WO   WO2010111694 A2   9/2010

(Continued)

OTHER PUBLICATIONS

Oct. 1, 2011 List of Art Rejections, 1 page.

*Primary Examiner* — Hashem Farrokh
(74) *Attorney, Agent, or Firm* — PatentVentures; Bennett Smith; Korbin Van Dyke

(57) ABSTRACT

A system, method, and computer program product are provided for converting logical block address de-allocation information in a first format to a second format. In use, logical block address de-allocation information is received in a first format associated with a first protocol. Additionally, the logical block address de-allocation information in the first format is converted to a second format associated with a second protocol.

21 Claims, 4 Drawing Sheets

U.S. PATENT DOCUMENTS

| | | | |
|---|---|---|---|
| 6,948,026 B2 | 9/2005 | Keays | 711/103 |
| 6,973,531 B1 | 12/2005 | Chang et al. | 711/103 |
| 6,985,992 B1 | 1/2006 | Chang et al. | 711/103 |
| 7,000,063 B2 | 2/2006 | Friedman et al. | 711/103 |
| 7,032,087 B1 | 4/2006 | Chang et al. | 711/156 |
| 7,035,967 B2 | 4/2006 | Chang et al. | 711/103 |
| 7,076,605 B1* | 7/2006 | Son | 711/113 |
| 7,096,313 B1 | 8/2006 | Chang et al. | 711/103 |
| 7,103,732 B1 | 9/2006 | Chang et al. | 711/156 |
| 7,120,729 B2 | 10/2006 | Gonzalez et al. | 711/103 |
| 7,395,384 B2 | 7/2008 | Sinclair et al. | |
| 7,552,306 B2 | 6/2009 | Madhavarao et al. | |
| 7,681,008 B2 | 3/2010 | Tomlin et al. | |
| 7,689,762 B2 | 3/2010 | Hobson | |
| 7,711,897 B1* | 5/2010 | Chatterjee et al. | 711/114 |
| 7,752,412 B2 | 7/2010 | Tomlin et al. | |
| 2004/0081179 A1 | 4/2004 | Gregorcyk, Jr. | |
| 2005/0102323 A1 | 5/2005 | Henderson et al. | |
| 2006/0004935 A1* | 1/2006 | Seto et al. | 710/62 |
| 2006/0020744 A1 | 1/2006 | Sinclair et al. | |
| 2006/0020745 A1 | 1/2006 | Conley et al. | |
| 2007/0005815 A1 | 1/2007 | Boyd et al. | |
| 2007/0030734 A1* | 2/2007 | Sinclair et al. | 365/185.11 |
| 2007/0234117 A1* | 10/2007 | Elliott et al. | 714/22 |
| 2008/0082741 A1* | 4/2008 | Biessener et al. | 711/112 |
| 2008/0082773 A1 | 4/2008 | Tomlin et al. | |
| 2008/0082774 A1 | 4/2008 | Tomlin et al. | |
| 2008/0091898 A1 | 4/2008 | Takahashi et al. | |
| 2008/0155145 A1 | 6/2008 | Stenfort | |
| 2008/0155162 A1 | 6/2008 | Stenfort | |
| 2008/0155163 A1 | 6/2008 | Stenfort | |
| 2008/0155562 A1 | 6/2008 | Stenfort | |
| 2008/0215926 A1 | 9/2008 | Stenfort | |
| 2008/0229045 A1* | 9/2008 | Qi | 711/170 |
| 2009/0077315 A1 | 3/2009 | Ogasawara | |
| 2009/0313411 A1 | 12/2009 | Stenfort | |
| 2009/0313443 A1 | 12/2009 | Stenfort | |
| 2009/0313527 A1 | 12/2009 | Stenfort | |
| 2010/0058021 A1* | 3/2010 | Kawamura | 711/171 |
| 2010/0250829 A1 | 9/2010 | Stenfort | |
| 2010/0250830 A1 | 9/2010 | Stenfort | |
| 2011/0004710 A1 | 1/2011 | Stenfort | |
| 2011/0004718 A1 | 1/2011 | Stenfort | |

FOREIGN PATENT DOCUMENTS

| | | |
|---|---|---|
| WO | WO2010111694 A3 | 9/2010 |
| WO | W02011003050 A2 | 1/2011 |
| WO | W02011003050 A3 | 1/2011 |

* cited by examiner

SYSTEM, METHOD, AND COMPUTER PROGRAM PRODUCT FOR CONVERTING LOGICAL BLOCK ADDRESS DE-ALLOCATION INFORMATION IN A FIRST FORMAT TO A SECOND FORMAT

FIELD OF THE INVENTION

The present invention relates-to-memory devices, and more particularly to de-allocating memory in such memory devices.

BACKGROUND

Solid state disks (SSDs) store data differently than hard disk drives (HDDs). An HDD typically allocates a sector of space for every logical block address (LBA). In general, the location of this logical block address does not move.

Solid state disks do not typically pre-allocate space for each logical block address. In addition, solid state disks are operated to periodically move stored data from one location to another to avoid data loss. In some cases, this movement of data may result in a loss of performance and additional wear on a solid state disk.

To avoid this problem it is desirable for an operating system to "free up" logical block addresses on a solid state disk when the data contained in these logical block addresses is no longer valid. To date, techniques for freeing logical block addresses on a solid state disk when the data is no longer valid have been relatively inefficient. There is thus a need for addressing these and/or other issues associated with the prior art.

SUMMARY

A system, method, and computer program product are provided for converting logical block address de-allocation information in a first format to a second format. In use, logical block address de-allocation information is received in a first format associated with a first protocol. Additionally, the logical block address de-allocation information in the first format is converted to a second format associated with a second protocol.

DETAILED DESCRIPTION

Figure 1:
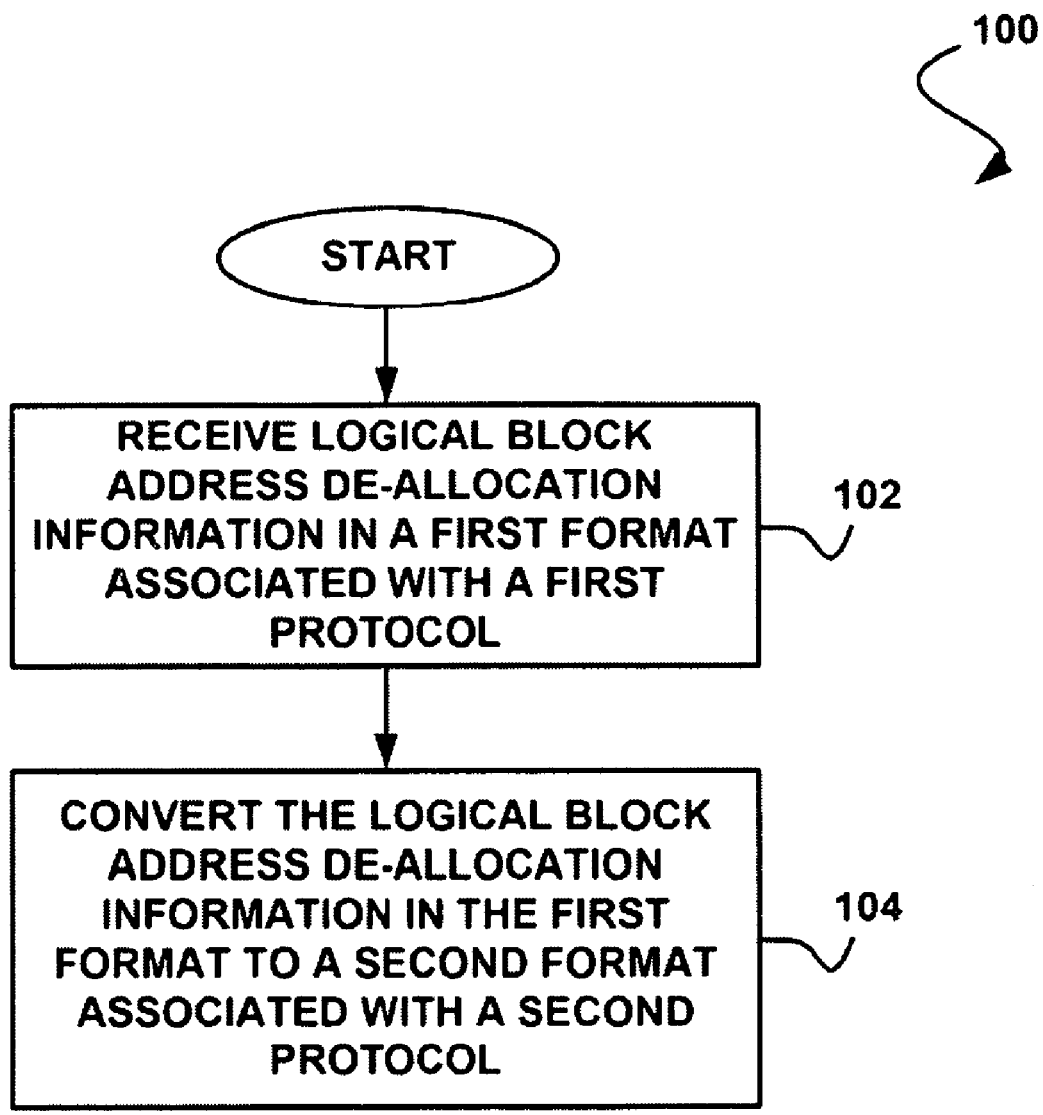
FIG. 1 shows a method for converting logical block address (LBA) de-allocation information in a first format to a second format, in accordance with one embodiment.

FIG. 1 shows a method 100 for converting logical block address (LBA) de-allocation information in a first format to a second format, in accordance with one embodiment. As shown, logical block address de-allocation information is received in a first format associated with a first protocol. See operation 102.

In the context of the present description, a logical block address refers to any item capable of indicating a location of blocks of data stored on a memory device. For example, in one embodiment, the logical block address may include an address of a block of data in memory. In another embodiment, the logical block address may include an address of a portion of memory (e.g. a portion of an LBA sector, etc.).

The memory may include any type of memory. For example, the memory may include one or more solid state disk (SSDs). In this case, the SSD may include RAM (e.g. SRAM, DRAM, etc.).

In another embodiment, the SSD may include flash memory. In this case, the flash memory may include non-volatile flash memory. In various embodiments, the flash memory may include single-level cell (SLC) flash memory and/or multi-level cell (MLC) flash memory.

Further, in the context of the present description, de-allocation information refers to any information associated with the de-allocation of memory. For example, in various embodiments, the de-allocation information may include de-allocation commands (i.e. commands to de-allocate one or more portions of memory, etc.), allocation or de-allocation status, and/or any other information associated with de-allocation. In this case, de-allocation refers to any technique capable of freeing up logical block addresses, or portions thereof, in memory.

In addition to receiving the logical block address de-allocation information, the logical block address de-allocation information in the first format is converted to a second format associated with a second protocol. See operation 104. The first and second protocol may include any protocol or set of standards for physically connecting and/or transferring data between devices (e.g. computing devices, peripherals, etc.).

In one embodiment, the first and the second protocol may include one of a Small Computer System Interface (SCSI) protocol and an AT Attachment (ATA) protocol. For example, the first protocol may include an SCSI protocol and the second protocol may include an ATA protocol. As another example, the first protocol may include an ATA protocol and the second protocol may include an SCSI protocol.

In these cases, the formats associated with the protocols may include any standard format of the protocol. For example, the format associated with the SCSI protocol may include a standard SCSI format for de-allocation commands, tasks or primitives containing power or de-allocation information, and any other technique of communicating information. Similarly, the format associated with the ATA protocol may include a standard ATA format for de-allocation commands, power commands, primitives, and any other information.

Accordingly, in one embodiment, the logical block address de-allocation information in an SCSI format may be converted to an ATA format associated with the ATA protocol. In another embodiment, the logical block address de-allocation information in the ATA format may be converted to the SCSI format associated with the SCSI protocol. Of course, these formats are only examples, as de-allocation information in any format associated with a protocol may be converted to any other format associated with another protocol.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
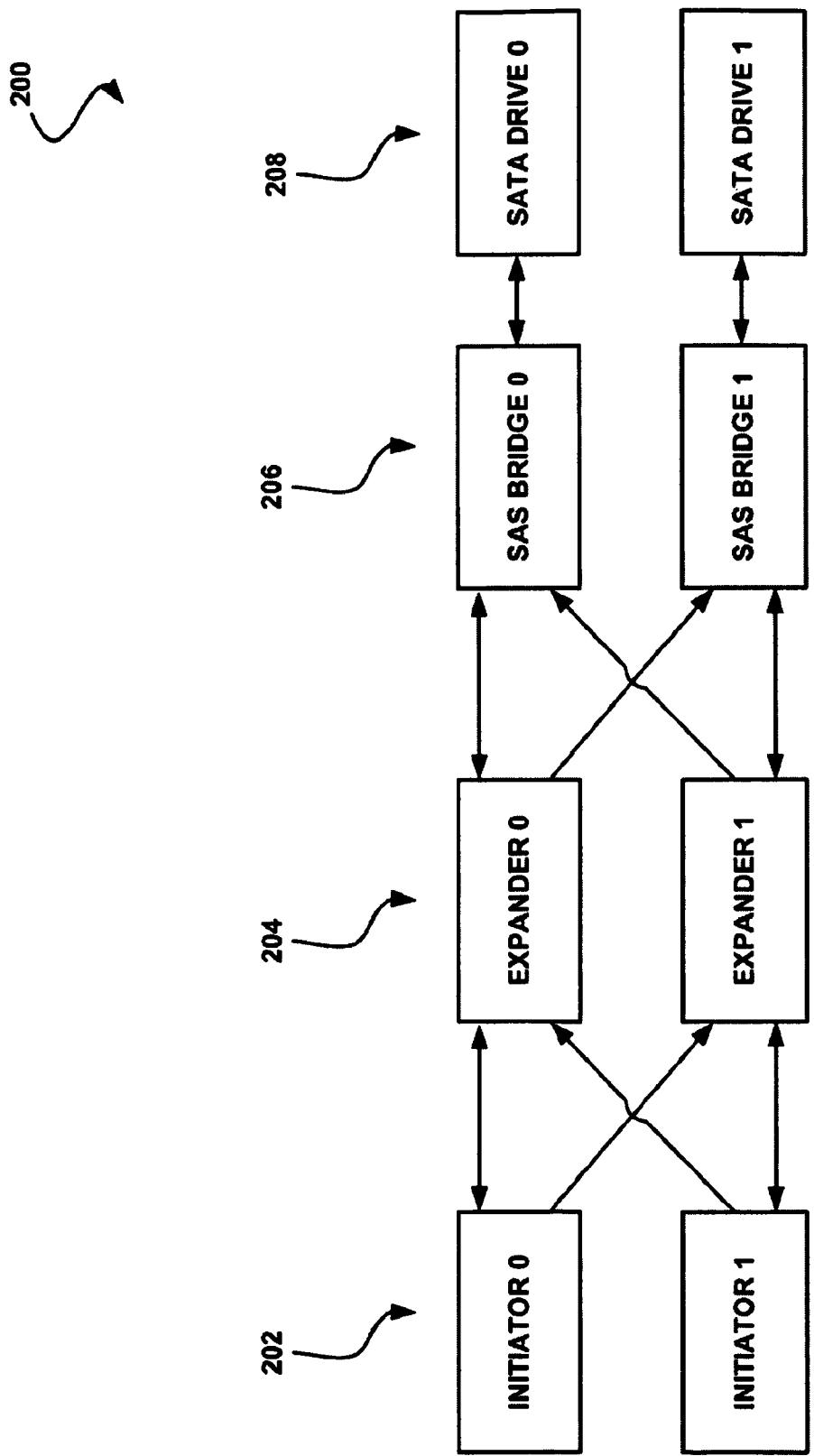
FIG. 2 shows a system for converting logical block address de-allocation information in a first format to a second format, in accordance with one embodiment.

FIG. 2 shows a system 200 for converting logical block address de-allocation information in a first format to a second format, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 may include one or more initiators 202. The initiators 202 may be coupled to and in communication with one or more expanders 204. In this case, the expanders 204 may represent any suitable switch. Additionally, one or more bridges 206 may be positioned such that information transmitted from the initiators 202 and/or the expanders 204 is received by the one or more bridges 206 before being communicated to one or more memory devices 208.

In one embodiment, the one or more bridges 206 may include one or more Serial Attached SCSI (SAS) bridges. Additionally, in one embodiment, the one or more memory devices 208 may include one or more Serial ATA (SATA) drives. In this case, the system 200 may operate as an SAS system with SAS bridges for converting Serial SCSI Protocol (SSP) information or Serial Management Protocol (SMP) information to SATA and ATA information.

In operation, one or more of the bridges 206 may receive logical block address de-allocation information, such as a command to de-allocate at least a portion of the one or more memory devices 208. This de-allocation command may be in a first format associated with a first protocol, such as an SSP or SMP format.

One or more of the bridges 206 may then convert the de-allocation command in the SSP or SMP format to a second format associated with a second protocol, such as a ATA format associated with the one or more SATA drives 208. In one embodiment, converting the logical block address de-allocation information in the first format to the second format may include converting an SCSI UNMAP command to an ATA data set management command (e.g. using a TRIM setting, etc.). The drives 208 may then de-allocate data in response to the converted de-allocation command.

It should be noted that the de-allocation command may include a command to de-allocate user data, protection information, and both user and protection data stored in the memory 208. Furthermore, the de-allocation command may include a command to de-allocate an LBA array, an LBA sector, and/or a portion of an LBA sector.

It should also be noted that the de-allocation information conversion is not limited to de-allocation commands. For example, in one embodiment, the bridges 206 may convert any SCSI command to an ATA command. These commands may include data queries, power notifications (e.g. power loss primitives such as a NOTIFY primitive, etc.), and various other information.

Additionally, the bridges 206 are not necessarily limited to converting information in one direction. The bridges 206 may also convert information being communicated from the memory devices 208. For example, in one embodiment, a de-allocation status may be sent from the memory devices 208. In this case, the logical block address de-allocation information may include the de-allocation status. In various embodiments, this status may be in response to a query or other command sent to the memory devices 208.

More information regarding sending de-allocation status information may be found in U.S. patent application Ser. No. 12/413,312, titled "SYSTEM, METHOD, AND COMPUTER PROGRAM PRODUCT FOR SENDING LOGICAL BLOCK ADDRESS DE-ALLOCATION STATUS INFORMATION," filed on Mar. 27, 2009, which is incorporated by reference in its entirety.

In another embodiment, SATA logical block address block alignment information may be converted to SCSI logical block address block alignment information using the bridges 206. In this case, converting the logical block address de-allocation information in the first format to the second format may include converting a SATA logical block address block alignment to an SCSI logical block address block alignment. The block alignment may be odd or even or have some other alignment.

In one embodiment, one or more of the bridges 206 and/or logic associated therewith may receive logical block address block alignment information in a first format associated with a first protocol. The bridges 206 and/or logic associated therewith may then convert the logical block address block alignment information in the first format to a second format associated with a second protocol. In this case, converting the logical block address block alignment information in the first format to the second format may include converting a SATA logical block address block alignment to an SCSI logical block address block alignment.

In some cases, user data and protection data stored in the memory devices 208 may be de-allocated independently. In one embodiment, it may be determined whether one of user data or protection data associated with the logical block address de-allocation information can be de-allocated independently. As an option, one or more of the bridges 206 may make this determination.

If it is determined that one of the user data or the protection data associated with the logical block address de-allocation information can be de-allocated independently, the user data and/or the protection data may be de-allocated independently. In one embodiment, this determination may be made based on a pattern of the user data or the protection data.

For example, the user data and/or the protection data may illustrate a pattern such that any data other than one full occurrence of the pattern in memory may be de-allocated. In this case, the de-allocating may occur in an LBA array, an LBA sector, and/or a portion of an LBA sector.

More information regarding de-allocating memory based on data patterns may be found in U.S. patent application Ser. No. 12/413,312, titled "SYSTEM, METHOD, AND COMPUTER PROGRAM PRODUCT FOR SENDING LOGICAL BLOCK ADDRESS DE-ALLOCATION STATUS INFORMATION," filed on Mar. 27, 2009, which has been incorporated by reference in its entirety.

In still another embodiment, power loss information may be received (e.g. by the bridges 206, etc.) in the first format associated with the first protocol. In this case, the power loss information in the first format may be converted to the second format associated with the second protocol. For example, the power loss information may include an SCSI power loss primitive (e.g. a NOTIFY primitive, etc.). Thus, converting the power loss information in the first format to the second format may include converting the SCSI power loss primitive into an ATA flush cache command. In one embodiment, the converting may also include converting the power loss primitive to a sleep command or a standby immediate command.

Additionally, converting the power loss information in the first format to the second format may include converting a power loss primitive or a power loss command to a primitive or command for hardening data. In the context of the present description, hardening data refers to any technique of writing data in cache to memory such as flash memory. Accordingly, a power loss primitive or command may be received by the bridges 206 and may be converted to any command or primitive for hardening the stored data.

More information regarding hardening data may be found in U.S. patent application Ser. No. 12/413,329, titled "SYSTEM, METHOD, AND COMPUTER PROGRAM PRODUCT FOR HARDENING DATA STORED ON A SOLID STATE DISK," filed on Mar 27, 2009, which is incorporated by reference in its entirety.

Figure 3:
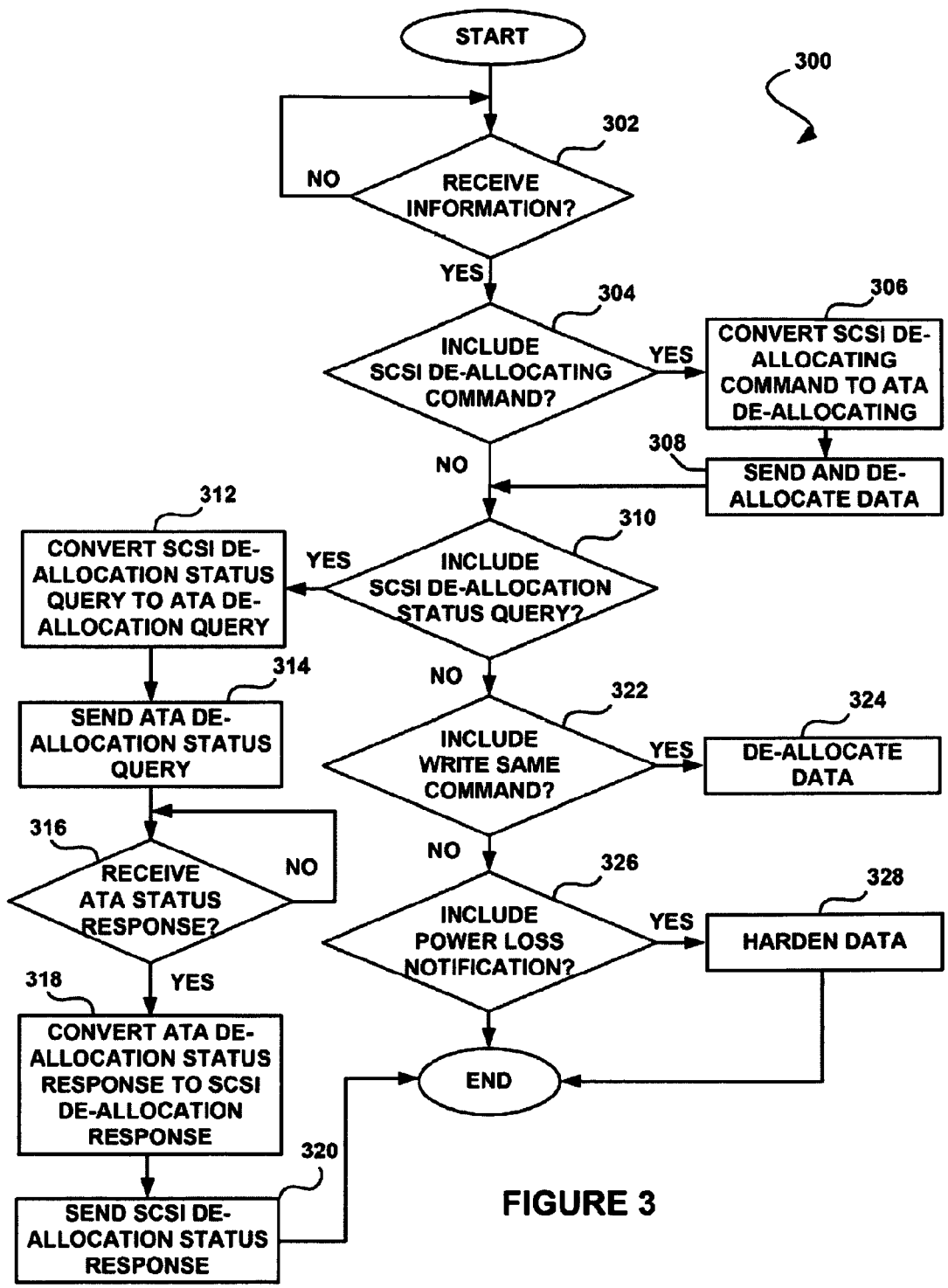
FIG. 3 shows a method for converting logical block address de-allocation information in a Small Computer System Interface (SCSI) format to an AT Attachment (ATA) format, in accordance with one embodiment.

FIG. 3 shows a method 300 for converting logical block address de-allocation information in an SCSI format to an ATA format, in accordance with one embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, it is determined if information is received at a bridge (e.g. an SAS bridge, etc.). See option 302. In one embodiment, this determination may be made at the bridge. In this case, the bridge may include logic and/or hardware for making such determination, as well as for making any other decisions and/or performing other functions.

If information is received at the bridge, it is determined whether the information includes an SCSI de-allocating command. See operation 304. If the information includes an SCSI de-allocating command, the SCSI de-allocating command is converted to an ATA de-allocating command. See operation 306.

In one embodiment, this conversion may include converting an SCSI UNMAP command to an ATA DATA SET MANAGEMENT command. Once the SCSI de-allocating command is converted to an ATA de-allocating command, the command is sent and the data is de-allocated. See operation 308. The de-allocation may include de-allocating user data, protection data, or both.

In the context of the present description, protection data refers to any data stored in memory that is utilized to ensure the accuracy and/or validity of user data. In this case, user data refers to any data that is stored in the memory that is not protection data.

As shown further in FIG. 3, it is determined whether the information includes an SCSI de-allocation status query. See operation 310. It should be noted that, in one embodiment, a de-allocation query need not be sent to receive de-allocation status information. For example, a memory device may automatically send de-allocation status information (e.g. upon de-allocation, at a timed interval, etc.).

If the information includes an SCSI de-allocation status query, the SCSI de-allocation status query is converted to an ATA de-allocation status query. See operation 312. Once the SCSI de-allocation status query is converted to an ATA de-allocation status query, the de-allocation status query is sent to a memory device (e.g. a SATA drive, etc.). See operation 314.

It is then determined whether an ATA status response is received. See operation 316. In this case, an ATA status response refers to any response indicating de-allocation status that is in an ATA format. This status may include user data de-allocation status and/or protection data de-allocation status.

If an ATA status response is received, the ATA status response is converted to a format associated with the SCSI protocol. See operation 318. The de-allocation status response may then be sent to a device that initiated the query (e.g. a memory controller, etc.). See operation 320.

In addition to determining whether the information received by the bridge includes de-allocation status information, it is also determined whether the received information includes a WRITE SAME command, or other pattern initiating command (e.g. a FORMAT command, etc.). See operation 322. If the received information includes a WRITE SAME command, or other pattern initiating command, data stored in the memory device may be de-allocated based on that command. See operation 324.

In this case, a WRITE SAME command, a FORMAT command, and other commands that include writing patterns may be used to determine that the memory location storing or directed to store duplicate data (e.g. any pattern of data following the initial data, etc.) may be de-allocated. This data may include user data and/or protection data. Furthermore, it should be noted that, while in one embodiment the bridge may be utilized to make this detection, in other embodiments, different devices may be utilized to make this detection (e.g. a memory controller, a protocol chip, etc.). Thus, such technique may be implemented in systems without bridges.

In this way, it may be determined automatically in ATA and SCSI, using WRITE SAME or other similar write commands, if user data and or protection data may be de-allocated independently. For example, a command may be received to write a pattern of data in a first format associated with a first protocol (e.g. a WRITE SAME command, a FORMAT command, etc.). The command to write a pattern of data in the first format may then be converted to a second format associated with a second protocol. User data and/or protection data may be de-allocated based on the converted command to write a pattern.

It may also be determined if the information received by the bridge includes a power loss notification. See operation 326. If a power loss notification is detected, the data stored in memory may be hardened. See operation 328.

For example, if the bridge receives a NOTIFY (POWER LOSS) primitive, the bridge may pass this information to an SSD so it can harden data. In various embodiments, this may be translated by bringing the communication link down, through an out-of-band (OOB) command or by sending another command. In one embodiment, a FLUSH CACHE ATA command may be sent as a result of the bridge receiving a NOTIFY (POWER LOSS) primitive. In another embodiment, the power loss primitive may be converted to a sleep command or a standby immediate command.

In this way, de-allocation information that is communicated from an initiator to a bridge, and from the bridge to an SSD may be used to de-allocate LBAs. In one embodiment, the bridge may be configured to support maximum UNMAP LBA count, and maximum block descriptor count. These may be based on firmware associated with the bridge.

It should be noted that both the ATA protocol and the SCSI protocol have a command that will de-allocate memory blocks. For example, the ATA protocol utilizes the Data Set Management Command to de-allocate blocks. The format of this command is illustrated in Table 1.

TABLE 1

Data Set Management Command

| Relevant Fields | Description |
|---|---|
| Feature | If bit 0 is set to "1" this is a "TRIM" function |
| Count | This is the number of 512 byte Data Structures to be transferred from the host to device. A value of "0" is 65,536 blocks. |
| Command | 06h |

The host will then send data to the device as "Pin Data." The format of this data is shown in Table 2.

TABLE 2

Pin Data Format

| Byte | Entry Number |
|---|---|
| 0-7 | Entry 0 |
| 8-15 | Entry 1 |
| ... | |
| 496-511 | Entry 64 |

The count field may determine how many 512 byte data structures will be sent. The format of the pin data entry is shown in Table 3.

TABLE 3

| Pin Data Entry 0 |
|---|
| 63:48 Range |
| Length |
| 47:0 LBA Value |

It should be noted that a value of "0" for the range makes the entry invalid. Additionally, the data may be sorted in ascending LBA order and may not be overlapping.

Furthermore, there is information in the identify data that allows the host to determine information about the device. This data is shown in Table 4. It should be noted the command for changing support is Device Configuration Identify command.

TABLE 4

Identify Data

| Word | Bits | Description |
|---|---|---|
| 21 | 10 | Reporting support for the Data Set Management is changeable. |
| 69 | 14 | Deterministic Read After TRIM is supported. A value of "1" means the read data will be deterministic. |
| 169 | 0 | Trim bit in DATA SET MANAGEMENT is supported |

The SCSI protocol also allows the de-allocation of blocks (e.g. LBA). For example, there are a number of commands and related fields in SBC-3 capable of affecting thin provisioning. In the BLOCK LIMITS VPD PAGE there are some relevant fields. For example, the Maximum UNMAP LBA Count field is the maximum number of LBAs that may be unmapped in a single command. If the maximum number of LBAs that can be unmapped are constrained only by the amount of data contained in the UNMAP parameter list then this field may be set to FFFF_FFFFh. A value of 0 indicates this field is not supported.

The Maximum UNMAP Block Descriptor Count is the maximum number of UNMAP block descriptors that may be contained in the parameter data for the UNMAP command. If there is no limit, this field may be set to FFFF_FFFFh. If this field is not supported then the field may be set to 0.

The FORMAT UNIT is also relevant. When formatting a thin provisioned device if protection is enabled then the protection field should be 64'hFFFF_FFFF_FFFF_FFFF. If protection is not enabled, then the device may be formatted to the Initialization Pattern based on the Initialization pattern descriptor. It should be noted that the initialization pattern type field may be set to "00" (e.g. a device use default pattern, etc.) and the initialization pattern length may be set to "0." Other values of "initialization pattern type" will produce patterns based on the data sent to the device. Thus, the device may be instructed to format with pattern "X, Y, Z," protection bytes of all FF's, UNMAP all LBAs, or have none of the LBAs unmapped due to how data is stored.

The Read Capacity Command also has a number of relevant parameter fields for thin provisioning. The fields are shown in Table 5.

TABLE 5

Read Capacity Fields

| Field | Description |
|---|---|
| TPE | If set to "1" this indicates this is a thin provisioned device. |
| LOWEST ALIGNED LOGICAL BLOCK ADDRESS | This field points to the lowest LBA aligned block. |
| LOGICAL BLOCKS PER PHYSICAL BLOCK EXPONENT | This field will describe the number of physical blocks per logical block. |
| TPRZ | In a thin provisioned device if this is set to "1" the device will return "0"s for the user data. If this bit is set to "0" the device shall return user data with any random value. The protection data is NOT specified by this bit. |

Table 6 shows Protection Decode Fields. In this case, if protection is enabled and the P_I_EXPONENT field is non-zero then there is more than one protection field for each LBA.

TABLE 6

Protection Decode Fields

| Field | Description |
|---|---|
| PROT_EN and P_TYPE | This describes the protection mode (0-3). |
| P_I_EXPONENT | This determines the protection information interval placed within each logical block. |

In some cases, a Verify command may have special handling when issued to an unmapped block. If BYTECHK is "0" then the device may assume the LBA has been verified for all unmapped block. If BYTECHK is "1" then the device shall terminate the command with a check condition.

The UNMAP command may be used to de-allocate LBAs from a thin provisioned device. Once an UNMAP function has been performed, the data from the unmapped LBA may not be read by any other LBA. Additionally, the data from the unmapped LBA may or may not be indeterminate. Further, the data from the unmapped LBA after the UNMAP operation should not change (e.g. multiple reads of an unmapped LBA shall always return the same data). Still yet, if protection is enabled then the protection data may not be set to 64'hFFFF_FFFF_FFFF_FFFF when the data is unmapped.

Relevant fields in the UNMAP command are shown in Table 7.

TABLE 7

Relevant UNMAP Command Fields

| Field | Description |
| --- | --- |
| Op Code | This is the command code. This is (42h). |
| Parameter List Length | This is the length of the parameter list in bytes to be sent to the device. |

The parameter list may cause structures to be built to pass a list of UNMAP block descriptors. The relevant fields in the descriptor are shown in Table 8.

TABLE 8

UNMAP Descriptor Fields

| Field | Description |
| --- | --- |
| UNMAP LBA | This is the starting LBA to UNMAP. |
| Number of Logical Blocks | This is the number of LBAs to UNMAP. |

It should be noted that when multiple descriptors are passed, the LBAs may be in any order and may overlap. If the LBA plus the number of blocks exceed the capacity of the device, a check condition may be returned. Additionally, if the number of logical blocks is 0, this is typically not an error condition. If the number of logical blocks in the UNMAP block descriptor exceed the VPD allowed setting, or the number of UNMAP block descriptors exceed the VPD setting, then a check condition may be returned.

The WRITE SAME command can be used to write the same data to many LBAs. Depending on the LBDATA and PBDATA bits, however, the information may not be identical. If the UNMAP bit is set, the blocks should be UNMAPPED and not written to if possible. When UNMAPPING, the user data may be 0 and the protection data may be 64'hFFFF_FFFF_FFFF_FFFF. If this condition is not satisfied by the WRITE SAME settings, then the write may take place even when the UNMAP bit is set.

It should be noted that it is expected that a WRITE SAME command issued with and without the UNMAP bit set is expected to have the exact same result if the data is read back. The permutations of possible data patterns are in Table 9.

If a write is unable to complete due to no more resources, a check condition may be returned informing the initiator the write failed but resources are being freed and that the write should be tried again. If it is not expected to have space for this command, status may be returned to the initiator of this condition.

It should be noted that, currently, FORMAT translation is described in SAT. There are, however, optimizations that may improve the life of the drive. If the LBAs are going to be written with all 0's in the user field and no protection, or all 0's in the user field and 64'hFFFF_FFFF_FFFF_FFFF in the protection field, the DATA SET MANAGEMENT/TRIM command may be used. This may be based on the IP bit in the FORMAT command.

It should be noted the ATA protocol and the SCSI protocol commands and associated descriptions provided herein are examples of commands and fields that may be converted to or from different formats using the techniques and functionality described above. In other embodiments, any command or information in a first protocol format may be converted to a second protocol format.

Figure 4:
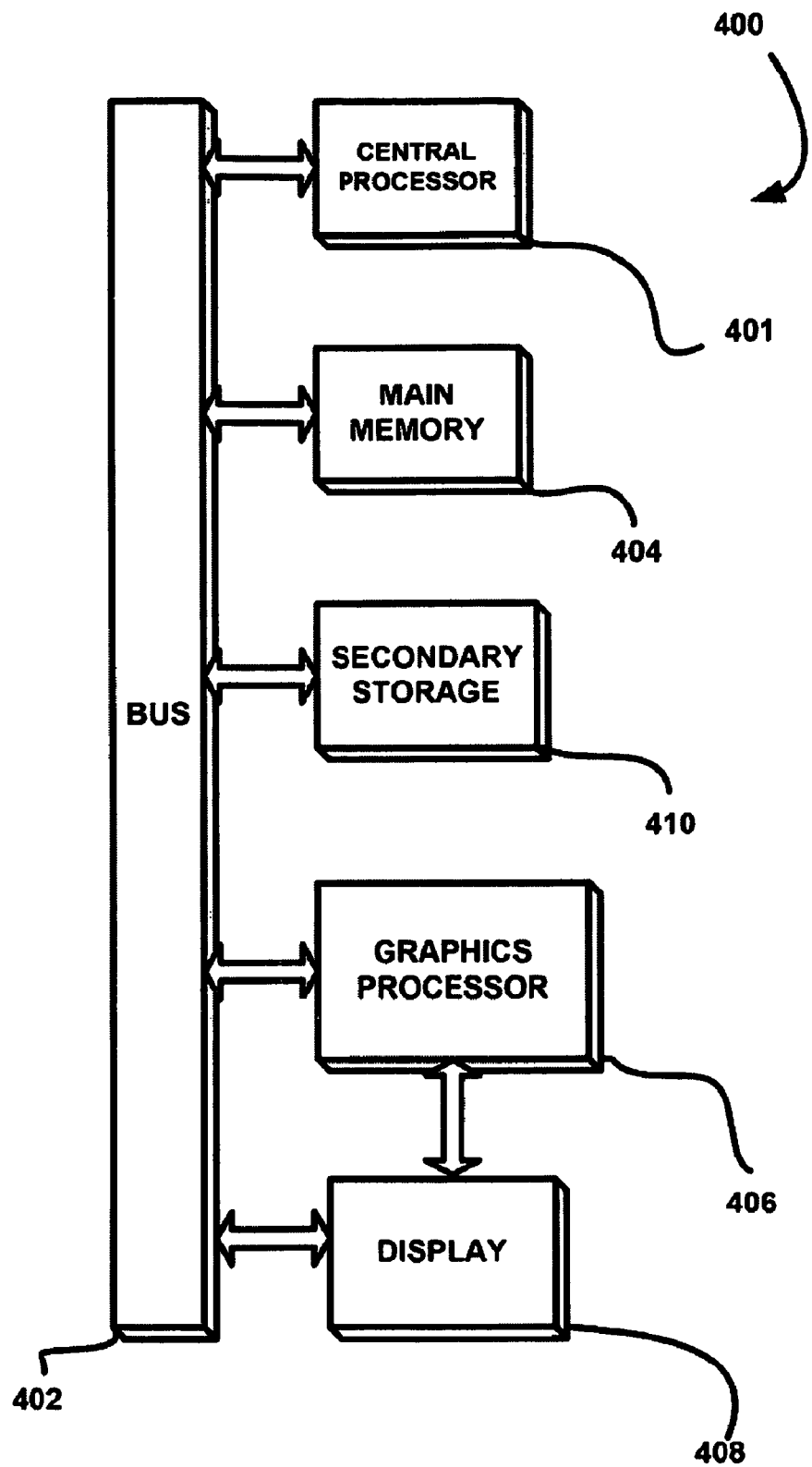
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of

TABLE 9

LBDATA/PBDATA Fields

| LBDATA | PBDATA | Description |
| --- | --- | --- |
| 0 | 0 | If the media is formatted with type 1 or 2 protection then:<br>1. The Logical Block Reference Tag shall be placed in the first block and this shall be incremented for each block following this one.<br>If the media is formatted with type 1, 2, or 3 protection then:<br>1. If the ATO bit is set to "1" in the Control Mode Page then the application tag shall be placed into every frame.<br>2. The Logical Block Guard Field shall be placed into each block. |
| 0 | 1 | If the media is formatted with protection 1, 2 or 3 then the data shall be formatted with protection values of 64'hFFFF_FFFF_FFFF_FFFF.<br>If the media is not formatted with protection then the first 8 bytes of the block shall be formatted with the physical sector address. |
| 1 | 0 | If the media is formatted with protection 1, 2, or 3 then the data shall be formatted with protection values of 64'hFFFF_FFFF_FFFF_FFFF.<br>If the media is not formatted with protection then the first 4 bytes of the block shall be formatted with an unusual concatenation of the LBA - see SBC-3 Table 94 for details. |
| 1 | 1 | This is an illegal condition that should be Check Conditioned. | course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving logical block address de-allocation information in a first format associated with a first protocol;
    converting the logical block address de-allocation information in the first format to a second format associated with a second protocol; and
    determining whether one of user data or protection data associated with the logical block address de-allocation information can be de-allocated independently.

2. The method of claim 1, wherein the first protocol includes a Small Computer System Interface (SCSI) protocol and the second protocol includes an AT Attachment (ATA) protocol.

3. The method of claim 1, wherein the first protocol includes an ATA protocol and the second protocol includes an SCSI protocol.

4. The method of claim 1, wherein the logical block address de-allocation information includes a de-allocation command.

5. The method of claim 4, wherein the de-allocation command includes a command to de-allocate at least one of user data and protection information.

6. The method of claim 1, wherein the logical block address de-allocation information includes a de-allocation status.

7. The method of claim 1, further comprising de-allocating one of the user data or the protection data independently, if it is determined that one of the user data or the protection data associated with the logical block address de-allocation information can be de-allocated independently.

8. A method, comprising:
    receiving logical block address de-allocation information in a first format associated with a first protocol;
    converting the logical block address de-allocation information in the first format to a second format associated with a second protocol; and
    wherein converting the logical block address de-allocation information in the first format to the second format includes converting an SCSI UNMAP command to an ATA data set management command.

9. The method of claim 8, further comprising receiving power loss information in the first format associated with the first protocol.

10. The method of claim 9, further comprising converting the power loss information in the first format to the second format associated with the second protocol.

11. The method of claim 10, wherein converting the power loss information in the first format to the second format includes converting one of a power loss primitive or a power loss command to one of a primitive or command for hardening data.

12. The method of claim 8, further comprising receiving a command to write a pattern of data in the first format associated with the first protocol.

13. The method of claim 12, further comprising converting the command to write a pattern of data in the first format to the second format associated with the second protocol.

14. A method, comprising:
    receiving logical block address de-allocation information in a first format associated with a first protocol;
    converting the logical block address de-allocation information in the first format to a second format associated with a second protocol;
    receiving power loss information in the first format associated with the first protocol;
    converting the power loss information in the first format to the second format associated with the second protocol; and
    wherein converting the power loss information in the first format to the second format includes converting an SCSI power loss primitive to an ATA flush cache command.

15. A method, comprising:
    receiving logical block address de-allocation information in a first format associated with a first protocol;
    converting the logical block address de-allocation information in the first format to a second format associated with a second protocol;
    receiving a command to write a pattern of data in the first format associated with the first protocol;
    converting the command to write a pattern of data in the first format to the second format associated with the second protocol; and
    wherein the command to write a pattern of data includes one of a WRITE SAME command or a FORMAT command.

16. The method of claim 15, wherein at least one of user data or protection data is de-allocated based on the converted command to write a pattern of data.

17. A method, comprising:
- receiving logical block address de-allocation information in a first format associated with a first protocol;
- converting the logical block address de-allocation information in the first format to a second format associated with a second protocol; and
- wherein converting the logical block address de-allocation information in the first format to the second format includes converting a SATA logical block address block alignment to an SCSI logical block address block alignment.

18. A computer program product embodied on a tangible computer readable medium, comprising:
- computer code for receiving logical block address de-allocation information in a first format associated with a first protocol;
- computer code for converting the logical block address de-allocation information in the first format to a second format associated with a second protocol; and
- wherein converting the logical block address de-allocation information in the first format to the second format includes converting an SCSI UNMAP command to an ATA data set management command.

19. The computer program product of claim 18, further comprising:
- computer code for receiving power loss information in a first format associated with a first protocol;
- computer code for converting the power loss information in the first format to a second format associated with a second protocol; and
- wherein converting the power loss information in the first format to the second format includes converting one of a power loss primitive or a power loss command to one of a primitive or command for hardening data.

20. An apparatus, comprising:
- a bridge for receiving logical block address de-allocation information in a first format associated with a first protocol and for converting the logical block address de-allocation information in the first format to a second format associated with a second protocol; and
- wherein converting the logical block address de-allocation information in the first format to the second format includes converting an SCSI UNMAP command to an ATA data set management command.

21. The apparatus of claim 20, further comprising:
- wherein the bridge is further for receiving power loss information in a first format associated with a first protocol and for converting the power loss information in the first format to a second format associated with a second protocol; and
- wherein converting the power loss information in the first format to the second format includes the bridge converting one of a power loss primitive or a power loss command to one of a primitive or command for hardening data.

* * * * *